US008931088B2

(12) United States Patent
Chen et al.

(10) Patent No.: US 8,931,088 B2
(45) Date of Patent: Jan. 6, 2015

(54) ADAPTIVE DISTINCT COUNTING FOR NETWORK-TRAFFIC MONITORING AND OTHER APPLICATIONS

(75) Inventors: Aiyou Chen, New Providence, NJ (US); Jin Cao, Edison, NJ (US); Lawrence E. Menten, Upper Saddle River, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 763 days.

(21) Appl. No.: 12/732,293

(22) Filed: Mar. 26, 2010

(65) Prior Publication Data
US 2011/0239299 A1 Sep. 29, 2011

(51) Int. Cl.
G06F 11/00 (2006.01)
H04L 29/06 (2006.01)
H04L 12/26 (2006.01)

(52) U.S. Cl.
CPC ........ H04L 63/1408 (2013.01); H04L 12/2602 (2013.01)
USPC .......................................................... 726/22

(58) Field of Classification Search
USPC .......................................................... 726/22
See application file for complete search history.

(56) References Cited

U.S. PATENT DOCUMENTS

| 5,914,938 | A | 6/1999 | Brady et al. |
|---|---|---|---|
| 7,321,659 | B2 | 1/2008 | Hall et al. |
| 7,577,250 | B2 | 8/2009 | Damgaard et al. |
| 2005/0229254 | A1* | 10/2005 | Singh et al. ..................... 726/23 |
| 2005/0254502 | A1* | 11/2005 | Choi ........................ 370/395.32 |

OTHER PUBLICATIONS

Andrej Cvetkovski, et al., "An Algorithm for Approximate Counting Using Limited Memory Resources," Proceedings of the 2007 ACM Sigmetrics International Conference on Measurement and Modeling of Computer Systems, Jun. 12-16, 2007, San Diego, California, USA (9 pages).

C. Estan, et al., "Bitmap Algorithms for Counting Active Flows on High Speed Links," Proceedings of the 3rd ACM SIGCOMM IMC Conference on Internet Measurement, 2003, pp. 153-166.

P. Flajolet, "On Adaptive Sampling," Computing, vol. 34, 1990, pp. 391-400.

P. Gibbons, "Distinct Sampling for Highly-accurate Answers to Distinct Values Queries and Event Reports," The VLDB Journal, 2001, pp. 541-550.

A. Metwally, et al, "Why Go Logarithmic If We Can Go Linear? Towards Effective Distinct Counting of Search Traffic," In Proc. ACM EDBT, Mar. 2008 (12 pages).

(Continued)

*Primary Examiner* — Minh Dinh
*Assistant Examiner* — Devin Almeida
(74) *Attorney, Agent, or Firm* — Mendelsohn, Drucker & Dunleavy, P.C.; Yuri Gruzdkov; Steve Mendelsohn

(57) ABSTRACT

In one embodiment, a counting method of the invention uses an adaptive sketching-update process to compress an unknown cardinality into a counter value that counts the number of binary ones in a hashed bitmap vector. The sketching-update process is probabilistic in nature and uses bit-flip probabilities that are adaptively decreased as the counter value increases. Parameters of the sketching-update process are selected so that the relative error of cardinality estimates obtained based on the counter values is relatively small and substantially constant over a relatively wide range of cardinalities, e.g., from one to about one million. Due to the latter property, the counting method can advantageously be implemented in the form of embedded software that relies on a relatively small, fixed amount of memory.

22 Claims, 3 Drawing Sheets

(56) References Cited

OTHER PUBLICATIONS

C. Hu, et al, "Accurate and Efficient Traffic Monitoring Using Adaptive Non-linear Sampling Method," In IEEE INFOCOM Proceedings, 2008 (9 pages).

R. Morris, et al. "Counting Large Numbers of Events in Small Registers," Commun. ACM, 21(10), 1978, pp. 840-842.

Aiyou Chen, et al., "Distinct Counting with a Self-Learning Bitmap," Data Engineering, 2009. ICDE '09. IEEE 25th International Conference on, IEEE Mar. 29, 2009; pp. 1171-1174, XP031447797.

Notification of Transmittal of the International Search Report and the Written Opinion of the International Searching Authority, or the the Declaration; Mailed Jul. 12, 2011 for the corresponding International Application No. PCT/US2011/029036.

* cited by examiner

300

ADAPTIVE DISTINCT COUNTING FOR NETWORK-TRAFFIC MONITORING AND OTHER APPLICATIONS

BACKGROUND

1. Field of the Invention

The present invention generally relates to distinct counting and, more specifically but not exclusively, to network-traffic monitoring based on adaptive distinct counting.

2. Description of the Related Art

This section introduces aspects that may help facilitate a better understanding of the invention(s). Accordingly, the statements of this section are to be read in this light and are not to be understood as admissions about what is in the prior art or what is not in the prior art.

A computer network, often simply referred to as a network, is a collection of computers and/or network appliances operatively connected to one another via optical, wireline, and/or wireless links. A modern network might have a complicated topology and span a relatively large logical or geographical area, such as a university campus, a city neighborhood, or the collection of different sites of a multi-national corporation. Networking facilitates communications between users, e.g., via e-mail, instant messaging, telephony, and video-conferencing. Networking also enables various nodes of the network to share hardware, software, and data.

Network management is the process of planning, securing, engineering, and operating a network to enable its essential functions while reducing the risks of network failure, data loss, and/or security compromises. Network management generally includes the task of network-traffic monitoring, which is important, e.g., for proper allocation of resources and control of traffic flows. A network-traffic flow is a stream of data packets that share certain common characteristics, such as source and destination IP addresses. Network-traffic flows may need to be controlled, e.g., to meet quality-of-service (QoS) specifications and/or to prevent malicious processes from encumbering proper operation of the network.

SUMMARY

Disclosed herein are various embodiments of a counting method that can be used for network-traffic monitoring and other applications. In one embodiment, a counting method of the invention uses an adaptive sketching-update process to compress an unknown cardinality into a counter value that counts the number of binary ones in a hashed bitmap vector. The sketching-update process is probabilistic in nature and uses bit-flip probabilities that are adaptively decreased as the counter value increases. Parameters of the sketching-update process are selected so that the relative error of cardinality estimates obtained based on the counter values is relatively small and substantially constant over a relatively wide range of cardinalities, e.g., from one to about one million. Due to the latter property, the counting method can advantageously be implemented in the form of embedded software that relies on a relatively small, fixed amount of memory.

According to one embodiment, provided is a device-implemented method of distinct counting. The method has the steps of deriving a hash key for an item of a plurality of items; and applying a hash function to the hash key to identify a corresponding target bucket in a bitmap. The bitmap has a plurality of buckets, each for storing a binary value. The method further has a conditional step of: if the target bucket has a first value, then probabilistically changing the first value to a second value, with the probability of the change depending on the total number of second values stored in the bitmap.

According to another embodiment, provided is a counting device having one or more input ports for receiving a plurality of items; a memory for storing a bitmap having a plurality of buckets, each for storing a binary value; and a processor. The processor is adapted to derive a hash key for an item of the plurality of items; apply a hash function to the hash key to identify a corresponding target bucket in the bitmap; and probabilistically change a first binary value to a second binary value when the target bucket has a first binary value. The probability of the change used by the processor depends on the total number of second binary values stored in the bitmap.

BRIEF DESCRIPTION OF THE DRAWINGS

Other aspects, features, and benefits of various embodiments of the invention will become more fully apparent, by way of example, from the following detailed description and the accompanying drawings, in which.

DETAILED DESCRIPTION

Figure 1:
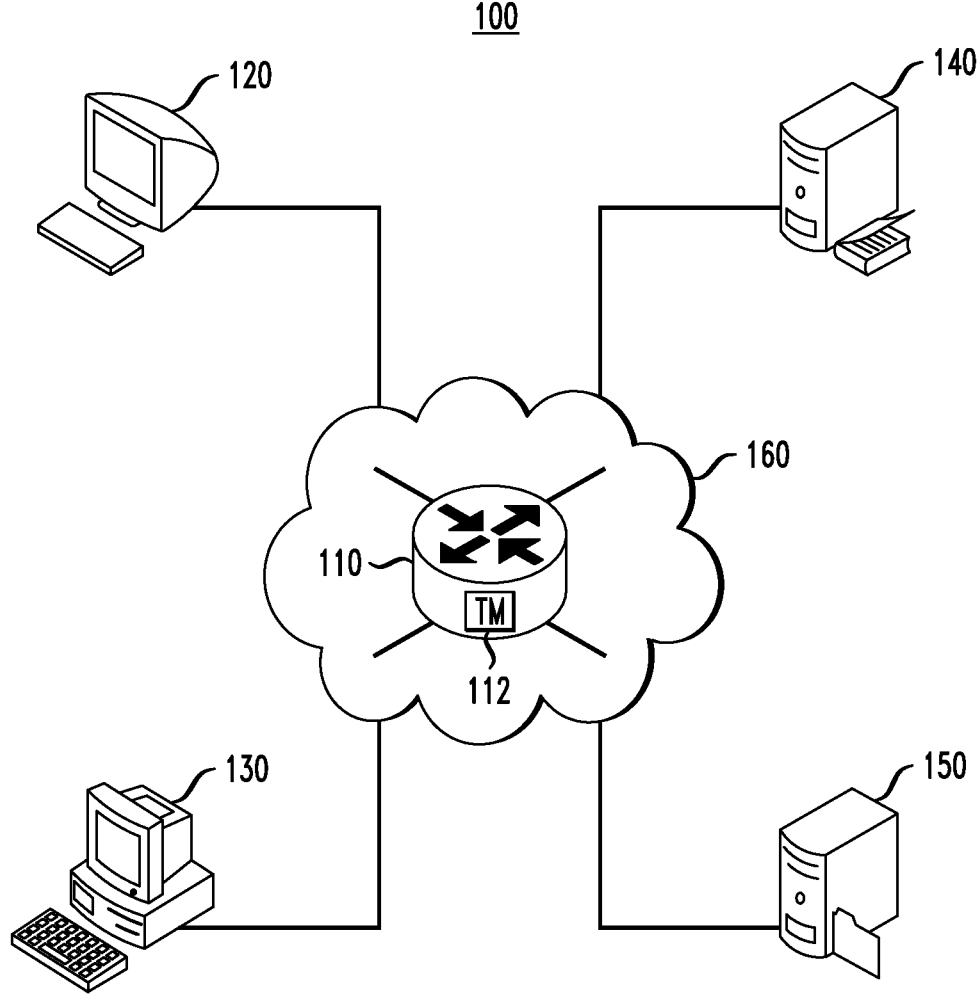
FIG. 1 shows a diagram of an exemplary network in which various embodiments of the invention can be practiced.

FIG. 1 shows a diagram of an exemplary network 100 in which various embodiments of the invention can be practiced. Network 100 includes various computing, communication, and/or service devices, such as a router 110, client terminals 120 and 130, a host computer 140, and a server 150. Router 110 is illustratively shown as part of a network cloud 160, which, in addition to router 110, includes a plurality of interconnected nodes (not explicitly shown in FIG. 1). Data packets exchanged by any two or more of devices 120-150 pass through one or more nodes of network cloud 160 and might be routed through or visible to router 110.

In one embodiment, router 110 hosts a traffic monitor (TM) 112, the operation of which is described in more detail below in reference to FIG. 2. Briefly, traffic monitor 112 uses various selected attributes of data packets that pass through router 110 to obtain real-time statistical estimates of the number of unique active traffic flows in network 100. The attributes may include, e.g., one or more of a source IP address, a destination IP address, a source and/or destination TCP/UDP port number, a URI, a URL, a domain name, and first several bytes of the UDP or TCP payload, where IP, TCP, UDP, URI, and URL stand for Internet Protocol, Transmission Control Protocol, User Datagram Protocol, Uniform Resource Identifier, and Uniform Resource Locator, respectively. The statistical estimates can be obtained on various time scales, e.g., from about a minute to tens of hours. Based on the obtained estimates, traffic monitor 112 can detect common behaviors of malicious processes, such as command-and-control activity in the form of peer-to-peer or fast-flux actions, vulnerability probing to or from an end-point, pseudo-random scanning for infected systems, DNS MX record searching, SMTP hosting, and spam broadcasting to SMTP servers, where DNS, MX, and SMTP stand for Domain Name System, Mail Exchanger, and Simple Mail Transfer Protocol, respectively. If traffic monitor 112 detects a malicious process in network 100, then the traffic monitor issues an alert for further remedial action, e.g., by a network administrator. Traffic monitor 112 may be implemented in various ways, such as in the form of dedicated circuitry or an application running on a central processing unit (CPU) of router 110.

Although FIG. 1 shows traffic monitor 112 as residing in router 110, other nodes of network 100 can similarly be used to host an instance of traffic monitor 112. For example, one or more of the following devices in network 100 can have appropriately configured instances/implementations of traffic monitor 112: (1) Ethernet switches, a representative example of which is Alcatel-Lucent OmniSwitch 6850; (2) elements of cable, Passive Optical Network (PON), and Digital Subscriber Line (DSL) network-access infrastructure, a representative example of which is Alcatel-Lucent 7302 Intelligent Services Access Manager; (3) edge routers, such as fiber-to-home, fiber-to-DSL, or fiber-to-cable devices, a representative example of which is Alcatel-Lucent 7750 Service Router; (4) firewall and intrusion-detection/prevention products, such as a Virtual Private Network (VPN) firewall; (5) web-services gateways; and (6) communication chip-sets, such as Broadcom 54g™ Chipsets.

Traffic monitor 112 is designed to use an adaptive counting method whose performance characteristics are substantially scale-invariant. More specifically, relative root-mean-square estimation errors of the adaptive counting method are substantially constant and independent of the unknown cardinalities of the network traffic over a relatively wide range of cardinality values (e.g., from 1 to about $10^9$). As used herein, the term "cardinality" refers to the number of unique elements in a set of elements. For example, if the set of elements is a set of destination IP addresses in the headers of various data packets routed through router 110, then the corresponding cardinality is the number of different (unique) destination IP addresses. The scalability of the adaptive counting method employed by traffic monitor 112 advantageously enables the traffic monitor to be implemented with a predetermined and fixed amount of memory that is significantly lower than the amount of memory required by prior-art traffic monitors achieving comparable accuracy. In addition, the adaptive counting method employed by traffic monitor 112 enables the traffic monitor to perform its functions with fewer memory-access operations than a comparable prior-art traffic monitor, which is advantageous for use, e.g., in bursty and/or high-speed traffic environment.

Figure 2:
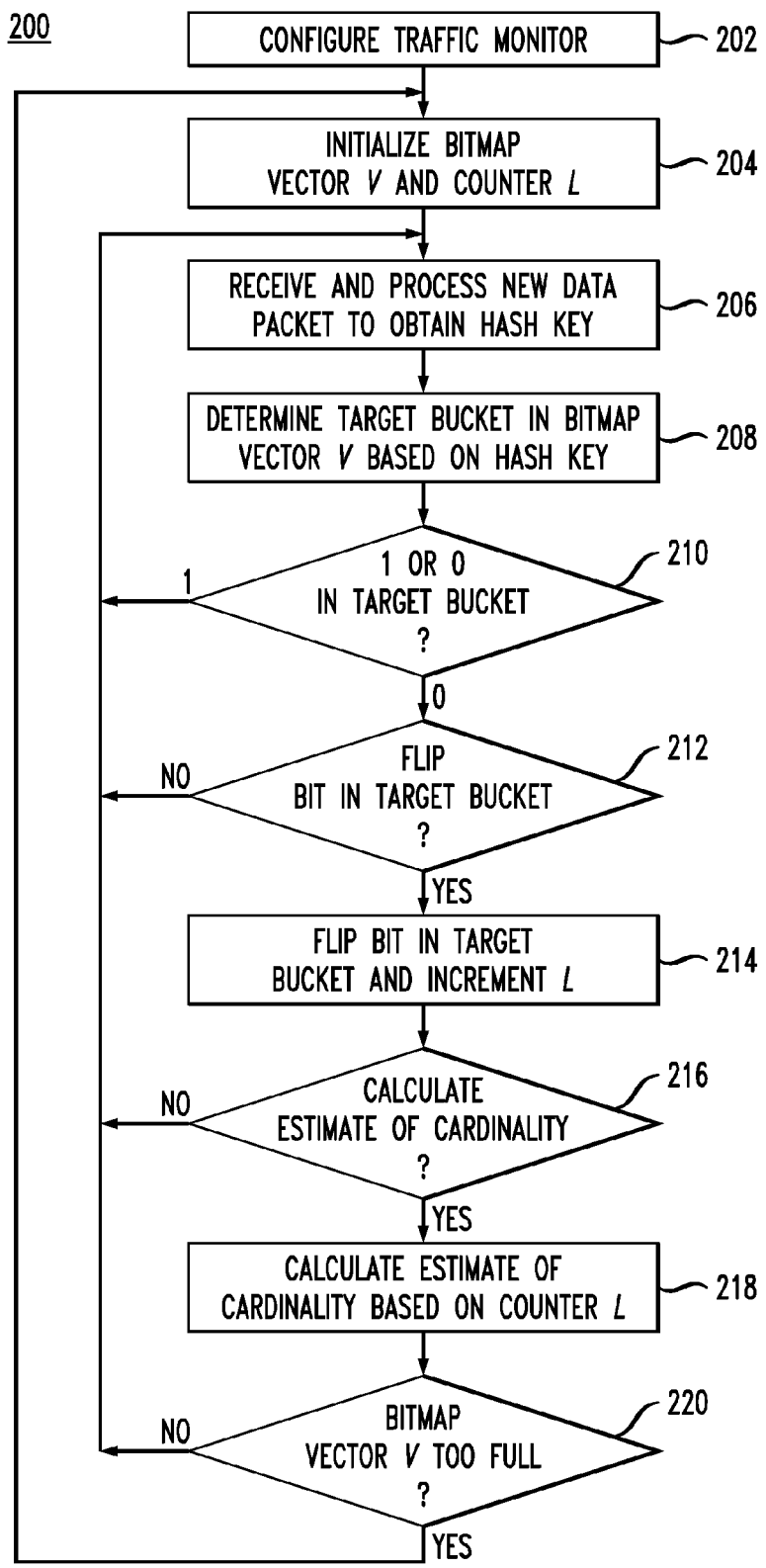
FIG. 2 shows a flowchart of a method of adaptive distinct counting that can be used at a node of the network shown in FIG. 1 according to one embodiment of the invention.

FIG. 2 shows a flowchart of a method 200 of adaptive distinct counting that can be used in traffic monitor 112 according to one embodiment of the invention. Method 200 begins at step 202, where traffic monitor 112 is appropriately configured to execute the method. In various embodiments, step 202 might include booting up appropriate circuitry in traffic monitor 112 and/or loading appropriate software into the CPU.

At step 204, a bitmap vector (V) and a counter (L) are initialized. Bitmap vector V has m components (buckets), each containing a binary value, e.g., a zero or a one. Counter L counts the number of ones in bitmap vector V. When bitmap vector V is initialized, all of its m components are set to zero. Accordingly, counter L is also set to zero.

At step 206, the node that hosts traffic monitor 112 (e.g., router 110) receives a new data packet. The received data packet is processed to obtain a corresponding hash key. In one implementation, a hash key is a binary value having a specified number (A) of bits. The hash key can be generated, e.g., by reading one or more selected fields in the packet's header. If the number of bits that have been read from the selected fields is greater than A, then the read bits can be truncated, compressed, or suitably transformed into a corresponding binary value having A bits.

At step 208, a hash function is applied to the hash key obtained at step 206 to determine a corresponding target bucket in bitmap vector V. In one implementation, the hash function used at step 208 is a universal hash function. As known in the art, universal hashing is a randomized algorithm for selecting a hash function F with the following property: for any two distinct inputs x and y, the probability that $F(x)=F(y)$ (i.e., that there is a hash collision between x and y) is about the same as if function F were a random function. Representative universal hash functions that can be used at step 208 are disclosed, e.g., in U.S. Pat. Nos. 7,577,250, 7,321,659, and 5,914,938, all of which are incorporated herein by reference in their entirety.

At step 210, the content of (i.e., the binary value stored in) the target bucket identified at step 208 is checked to determine whether it is a one or a zero. If the target bucket contains a one, then the processing of method 200 is directed back to step 206. If the target bucket contains a zero, then the processing of method 200 proceeds forward to step 212.

At step 212, it is determined whether or not to change the content of the target bucket from zero to one. If it is determined that the bit value is not to be changed, then the processing of method 200 is directed back to step 206. Alternatively, if it is determined that the bit value is to be changed from zero to one, then the processing of method 200 proceeds forward to step 214.

The determination performed at step 212 is probabilistic in nature and relies on a bit-flip probability $p_L$. As the notation implies, bit-flip probability $p_L$ depends on the current value stored in counter L, where $0 \le L \le m$. In one implementation, the bit-flip probability values used at different occurrences of step 212 form a generally decreasing series, in which $p_0$ is a pre-selected constant and $p_0 \ge p_1 \ge p_2 \ge \ldots \ge p_m$. In one implementation, bit-flip probability $p_L$ can be determined based on Eq. (4d), the description of which is given below in reference to representative pseudo-codes for implementing method 200. Note that bit-flip probability $p_L$ is applicable only when the target bucket contains a zero. Bit-flip probability $p_L$ is not applied to ones because step 210 redirects the processing of method 200 back to step 206 when the target bucket contains a one.

The decreasing trend in the bit-flip probability series $(p_0 \ge p_1 \ge p_2 \ge \ldots \ge p_m)$ is a foundation of the method's scalability, which enables the method to cover a relatively large range of cardinalities with (i) a substantially constant relative estimation error and (ii) a relatively small, fixed amount of memory space, e.g., about m bits for bitmap vector V and about $\log_2 m$ bits for counter L. Bit-flip probability $p_L$ can be analogized to a sampling rate, which decreases as the unknown cardinality of the processed set of data packets increases. If a universal hash function is used at step 208, then bucket locations corresponding to the series of decreasing sampling rates are determined during the actual mapping process and have a pseudo-random distribution over the length of bitmap vector V. This property of bitmap vector V is different from the corresponding property of prior-art bitmap vectors, such as a multi-resolution bitmap disclosed in an article authored by C. Estan, G. Varghese, and M. Fisk, entitled "Bitmap Algorithms for Counting Active Flows on High Speed Links," and published in the Proceedings of the $3^{rd}$ ACM SIGCOMM IMC Conference on Internet Measurement, 2003, pp. 153-166, which article is incorporated herein by reference in its entirety. More specifically, in a multi-resolution bitmap of Estan et al., the bitmap is partitioned first, and different sampling rates are then deliberately assigned to the resulting deterministic portions of the bitmap prior to the actual mapping.

At step 214, the zero in the target bucket is changed to one, and counter L is incremented. For example, a new value stored in counter L after the completion of step 214 can be the old value plus one. The use of other counter increments is also possible.

At step 216, it is determined whether or not to calculate an estimate of the cardinality for the processed set of data packets based on the value stored in counter L. If the decision is negative (i.e., not to calculate), then the processing of method 200 is directed back to step 206. Alternatively, if the decision is affirmative, then the processing of method 200 proceeds forward to step 218.

In one implementation, an affirmative decision to calculate an estimate of the cardinality can be made based on the time elapsed since the previous calculation. For example, a new estimate can be calculated every minute or every ten minutes. In an alternative implementation, an affirmative decision can be made based on the value of L/m, which represents the degree of "fullness" for bitmap vector V. For example, a new estimate of the cardinality can be calculated every time the degree of "fullness" increases by about 0.05 (or 5%) since the previous calculation.

At step 218, an estimate of the cardinality for the processed set of data packets is calculated based on the value stored in counter L. In one implementation, an estimate of the cardinality is calculated based on Eqs. (4a)-(4d), the description of which is given below in reference to representative pseudo-codes for implementing method 200.

At step 220, it is determined whether or not the degree of "fullness" for bitmap vector V has exceeded a selected threshold value (e.g., 70%). If bitmap vector V is deemed to be too full (i.e., the degree of fullness exceeds the threshold value), then the processing of method 200 is directed back to step 204, where the bitmap vector is reinitialized, and counter L is reset to zero. If bitmap vector V is not yet too full, then the processing of method 200 is directed back to step 206.

Now, two representative sets of pseudo-code for implementing method 200 will be described. The first of the two pseudo-code sets can be used to implement steps 204-214. The second of the two pseudo-code sets can be used to implement step 218.

Line 1 of Pseudo-Code Set 1 implements step 204. Configuration parameter r, which is used in line 1 to calculate the initial value of parameter q, is defined by Eqs. (1) and (2):

$$r = 1 - \frac{2}{C+1} \tag{1}$$

$$m = \frac{C}{2} + \frac{\log\left(1 + \frac{2N_{max}}{C}\right)}{\log\left(1 + \frac{2}{C-1}\right)} \tag{2}$$

where $N_{max}$ is the upper bound corresponding to the dynamic range for which method 200 is configured to count cardinalities. When the cardinality that is being counted reaches $N_{max}$, bitmap vector V is expected to be about 100% full (i.e., contain m ones). The values for $N_{max}$ and C can be selected based on the expected traffic characteristics. For example, a representative configuration might have $N_{max}=10^6$ and $C=10^4$. The length of bitmap vector V corresponding to these values of $N_{max}$ and C is m=26,517 bits (also see Eq. (2)). Configuration parameter r corresponding to these values of $N_{max}$ and C is r=0.9998.

Line 2 of Pseudo-Code Set 1 refers to a set of elements denoted U. This set, defined as $U=\{0,1\}^{c+d}$, represents a set of hash values x that are produced by applying the hash function of step 208 to the hash keys produced at various occurrences of step 206.

Line 3 of Pseudo-Code Set 1 converts, into a number, a hash value produced by applying the hash function of step 208 to the hash key of step 206. In this particular implementation, the conversion includes the step of truncating a binary value to c most significant bits (MSBs). One skilled in the art will appreciate that other suitable conversion methods can similarly be used. In general, depending on the hash function used at step 208, some post-processing of the corresponding hash value may or may not be required to identify the corresponding target bucket in bitmap vector V.

Line 4 of Pseudo-Code Set 1 contains an "if" operator that corresponds to step 210.

| Pseudo-Code Set 1: Sketching Update |
| --- |

| | |
| --- | --- |
| Configuration: | m and r – configuration parameters, where m is the size of bitmap vector V; and r is defined by Eqs. (1)-(2); |
| Input: | a stream of binary vectors x, each having the size c+d, where c is an integer that is related to m via equation $m = 2^c$; and d is a positive integer; |
| Output: | B – the number of buckets in bitmap vector V filled with ones; |
| 1: | Initialize: q as $q = \frac{2r}{1+r}$; V as V=(0,0, . . . 0); and L as L=0; |
| 2: | for $x = b_1 b_2 \ldots b_{c+d} \in U$ (where $b_i$ is the i-th bit of x) do |
| 3: | set $j := [b_1 b_2 \ldots b_c]_2$ (i.e., the value of c most significant bits of x in base 2) |
| 4: | if $V_j=0$ then |
| 5: | $u = [b_{c+1} b_{c+2} \ldots b_{c+d}]_2$ (i.e., the value of d least significant bits of x in base 2) |
| 6: | if $\frac{u}{2^d} < \frac{mq}{m-L}$ then |
| 7: | $V_j=1$ |
| 8: | L=L+1 |
| 9: | q=qr |
| 10: | B=L. |

Line 5 of Pseudo-Code Set 1 implements a generator of random numbers. More specifically, when a universal hash function is used at step 208, the d least significant bits (LSBs) of the corresponding hash values can be used, to a good approximation, as a source of random numbers. A representative value of d is d=30. Typically, d<<m can be used.

Line 6 of Pseudo-Code Set 1 contains an "if" operator that corresponds to step 212. The expression in the right side of the inequality used in the "if" operator represents the current value of bit-flip probability $p_L$ (see also Eq. (4d)).

Lines 7 and 8 of Pseudo-Code Set 1 correspond to step 214. More specifically, line 7 changes the value in the target bucket from 0 to 1. Line 8 increments counter L.

Line 9 of Pseudo-Code Set 1 changes the value of parameter q, which serves to reduce bit-flip probability $p_L$ for the next execution of line 6 (see also Eq. (4d)).

Line 10 of Pseudo-Code Set 1 reads out the current value of counter L, e.g., for use at step 218.

Note that, in the sketching-update process represented by Pseudo-Code Set 1, only a single hash-function operation is needed per data packet. The bit-flip probability (sampling rate) is changed only when the value stored in the target bucket is actually changed from 0 to 1. For example, if K buckets in bitmap vector V become filled with ones by the end of a counting period, then the sampling rate has been changed (updated) only K times. This property of the sketching-update process used in method 200 differs from the corresponding property of a comparably performing prior-art method, where the sampling rate(s) may need to be changed more than one time per bitmap update. These characteristics of method 200 are beneficial in that they enable a significant reduction in the amount of computations compared to most prior-art methods.

Conceptually, the sketching-update process represented by Pseudo-Code Set 1 compresses unknown cardinality n into counter value $B=L_n$, while using bitmap vector V as a compression vehicle. The subscript n used here with counter value L indicates that counter value $L_n$ corresponds to cardinality n. Since an inherent property of the compression process is that it is not a one-to-one transformation, a single integer counter value L may represent several (usually many) different n's.

An estimation process represented by Pseudo-Code Set 2 decompresses $L_n$ to obtain an estimate ($\hat{n}$) of cardinality n. The compression and decompression processes represented by Pseudo-Code Sets 1 and 2 complement each other and are specifically designed to keep the relative estimation error ($\sigma$) substantially constant over the entire intended operational range (e.g., [1, $N_{max}$]) of method 200, with the relative estimation error defined, e.g., by Eq. (3):

$$\sigma = \sqrt{\left(\frac{\hat{n}}{n} - 1\right)^2} \quad (3)$$

As used herein, the term "substantially constant" means that the relative estimation error does not deviate from the mean estimation error corresponding to the whole intended operational range by more than a fixed, relatively small amount, e.g., by more than ±10% or ±20%. For example, the relative estimation error can be substantially constant over a dynamic range that is at least about $10^5$. This characteristic of method 200 differs from the corresponding characteristic of a typical prior-art method, for which the relative estimation error might change significantly (e.g., by a factor of about 2) over a similar dynamic range. Since cardinality n is usually unknown a priori, method 200 generally provides more-reliable estimates of the unknown cardinalities than comparable prior-art methods.

One skilled in the art will appreciate that the counter-update process implemented by Pseudo-Code Set 1 relies on a series of $L_t$ values, $\{L_t: t=1, 2, \ldots n\}$, wherein the series follows a non-stationary Markov chain model defined by Eqs. (4a)-(4b):

$$L_t = L_{t-1} + 1 \text{ with probability } q_{L_{t-1}+1} \quad (4a)$$

$$L_t = L_{t-1} \text{ with probability } 1 - q_{L_{t-1}1} \quad (4b)$$

where $q_k$ and $p_k$ are defined by Eqs. (4c)-(4d):

$$q_k = \frac{m}{m-(k-1)} p_k^{-1} \quad (4c)$$

$$p_k = \frac{m}{m-(k-1)} \times \frac{2r}{1+r} \times r^{k-1} \quad (4d)$$

where parameters m and r are defined by Eqs. (1) and (2); and k is an index.

| Pseudo-Code Set 2: Estimation of Cardinality | |
|---|---|
| Configuration: | m, r, and C – configuration parameters, where m is the size of bitmap vector V; and r and C are defined by Eqs. (1)-(2); |
| Input: | B – the number of buckets in bitmap vector V filled with ones; |
| Output: | $\hat{n}$ – and estimate of cardinality; |
| 1: | $B = \min\left(B, m - \frac{C}{2}\right)$ |
| 2: | Compute: $t_B = \frac{C}{2}\left(\frac{1}{r^B} - 1\right)$ |
| 3: | $\hat{n} = t_B$ |
| 4: | Return $\hat{n}$. |

Note that configuration parameters r and C used in Pseudo-Code Set 2 are not independent configuration parameters because they are related through Eq. (1).

Let $T_k$ be an index corresponding to the distinct (unique) item that has caused a change in the corresponding target bucket of bitmap vector V from 0 to 1 so that, after the change, k buckets in the bitmap vector are filled with ones. In the Markov Chain Theory, $T_k$ is referred to as a stopping time. Although stopping times $T_k$ are generally unobservable in the framework of Pseudo-Code Sets 1 and 2, the Markov Chain Theory can be used to obtain relatively accurate estimates of the stopping times.

Line 1 of Pseudo-Code Set 2 performs an adjustment of the input value of B. The adjusted value of B computed in line 1 is different from the input value of B only for relatively large values of L, e.g., when cardinality n is relatively close to $N_{max}$. The use of the adjusted value of B instead of the input value of B is a corrective measure that prevents estimate $\hat{n}$ from exceeding $N_{max}$.

Line 2 of Pseudo-Code Set 2 computes an estimate ($t_B$) of stopping time $T_B$ using a formula derived based on the Markov Chain Theory.

Lines 3-4 of Pseudo-Code Set 2 compute and output estimate $\hat{n}$ of unknown cardinality n based on the stopping-time estimate computed in line 2.

Since it can be shown that cardinality n falls within the interval defined by stopping times $T_B$ and $T_{B+1}$, with the upper bound being excluded from the interval (i.e., n∈[$T_B,T_{B+1}$[), estimates of stopping-times $T_B$ and $T_{B+1}$ can be used to estimate n in various ways. Line 2 of Pseudo-Code Set 2 implements just one of the possible estimation schemes for estimating cardinality n based on estimates of the bounding stopping times ($T_B$ and $T_{B+1}$). One skilled in the art will appreciate that other estimation schemes can similarly be used to estimate cardinality n.

While method 200 has been described in reference to network-traffic monitoring, one skilled in the art will appreciate that the method can be adapted in a relatively straightforward manner for other useful applications. For example, method 200 can be adapted for use in Internet advertising, where the number of distinct surfers (visitors) is of great interest to both advertisers and service providers. More specifically, an advertiser can evaluate the effectiveness of its advertisement, e.g., by comparing the number of sales resulting from the advertisement with the number of distinct surfers that saw it. A service provider can similarly use the number of distinct surfers to evaluate the effectiveness of its advertisement-delivery system, which in turn can be used to negotiate prices with advertisers. Other application examples include the use of embodiments of method 200 in search engines and database-management systems.

Figure 3:
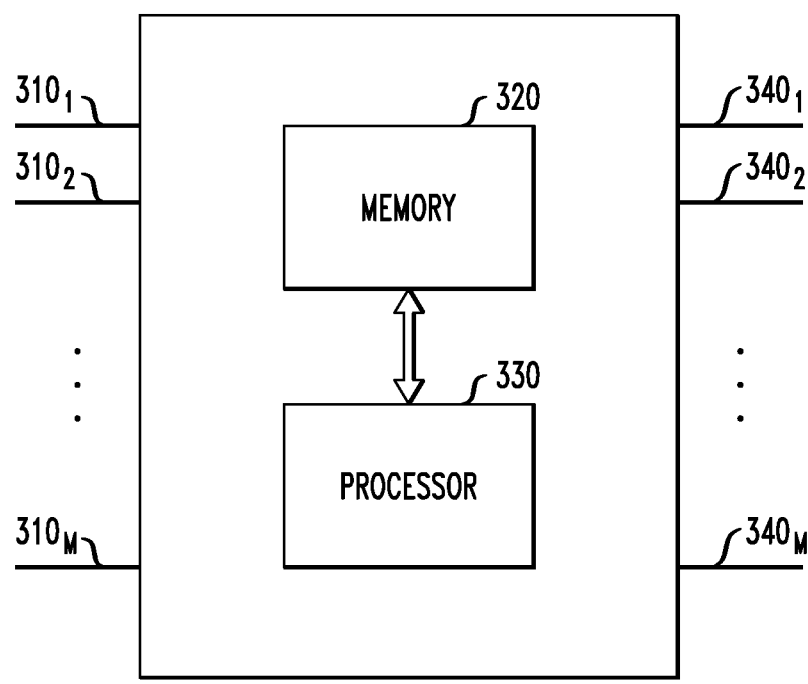
FIG. 3 shows a block diagram of a counting device according to one embodiment of the invention.

FIG. 3 shows a block diagram of a counting device 300 according to one embodiment of the invention. In one embodiment, counting device 300 can be used to implement traffic monitor 112 (FIG. 1). In an alternative embodiment, counting device 300 can be used in a search engine or a database-management system.

Device 300 has a plurality of input ports 310 for receiving a plurality of items that are to be sorted or counted based on a selected attribute. Depending on the particular embodiment, an item can be a data packet, a request to redirect to a particular IP address, a search-engine query, a database entry, a database query, etc. The received items are processed based on the corresponding item identifiers, which can be any suitable portion or field that carries information about the selected attribute. For a received item, device 300 might act either as a pass-through device that redirects the item to one of output ports 340 or as an end device that is a final destination for the item.

Device 300 is designed to implement a counting method analogous to method 200 and has a memory 320 and a processor 330. Memory 320 and processor 330 are operatively coupled to one another and, also, to input ports 310 and output ports 340. Memory 320 is used, e.g., to store a bitmap vector similar to the above-described bitmap vector V. Processor 330 is used to perform all necessary data processing, such as (i) hash-key derivation from item identifiers, (ii) hash-function application, (iii) probabilistic updates of bitmap vectors, (iv) inspection of bitmap contents, and (v) computation of cardinality estimates.

As used herein, the term "dynamic range" refers to the ratio between the largest and smallest possible cardinality values in an interval of cardinality values for which a counting method, such as method 200, is used. In contrast, the term "operational range" refers to a selected interval of cardinalities within the interval bounded by 1 and $N_{max}$.

While this invention has been described with reference to illustrative embodiments, this description is not intended to be construed in a limiting sense. For example, processor 330 in device 300 can be replaced by less general (e.g., application-specific) circuitry capable of performing the required operations. Although embodiments of the invention have been described in reference to bitmap vectors, other types of bitmaps can similarly be used. As used in the claims, the term "bitmap" should be construed as encompassing any suitable type of memory organization for indexed storage of data. Various modifications of the described embodiments, as well as other embodiments of the invention, which are apparent to persons skilled in the art to which the invention pertains are deemed to lie within the principle and scope of the invention as expressed in the following claims.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

The present invention may be implemented as circuit-based processes, including possible implementation on a single integrated circuit.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value of the value or range.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they formally fall within the scope of the claims.

What is claimed is:

1. A device-implemented method of distinct counting, the method comprising:
   (A) deriving a hash key for an item of a plurality of items;
   (B) applying a hash function to the hash key to identify a corresponding target bucket in a bitmap, wherein the bitmap has a plurality of buckets, each for storing a value; and
   (C1) if the target bucket has a first value, then probabilistically changing the first value to a second value, with a probability of the change depending on a total number of second values stored in the bitmap, wherein step (B) comprises:
      (B1) generating a hash value by applying the hash function to the hash key;
      (B2) converting the generated hash value into a number that is different from said hash value, wherein said converting includes truncating the generated hash value to a selected number of most significant bits; and
      (B3) using the number produced at step (B2) to identify the target bucket.

2. The method of claim 1, further comprising:
   (C2) if the target bucket does not have the first value, then leaving the target-bucket's value unchanged, wherein:
      the first value is a binary zero; and
      the second value is a binary one.

3. The method of claim 1, further comprising repeating steps (A), (B), and (C1) for a next item of the plurality.

4. The method of claim 1, wherein the probability $p_k$ of the change decreases as the number k of the second values stored in the bitmap increases as follows:

$$p_k = \frac{m}{m-(k-1)} \times \frac{2r}{1+r} \times r^{k-1}$$

where m is the number of buckets in the bitmap, and r is a positive value that is smaller than one.

5. The method of claim 4, wherein the value of r is determined as follows:

$$r = 1 - \frac{2}{C+1}$$

where C is a positive value defined by the following equation:

$$m = \frac{C}{2} + \frac{\log\left(1 + \frac{2N_{max}}{C}\right)}{\log\left(1 + \frac{2}{C-1}\right)}$$

where $N_{max}$ is a configuration parameter corresponding to an upper bound of a dynamic range of the method.

6. The method of claim 1, wherein the hash function is a universal hash function.

7. The method of claim 1, wherein different probabilities corresponding to different bucket locations with second values have a pseudo-random distribution over the bitmap.

8. The method of claim 1, wherein only a single hash-function operation is performed per item of the plurality.

9. The method of claim 1, wherein the number produced at step (B2) is a first portion of the generated hash value having the selected number of most significant bits of said hash value.

10. The method of claim 9,
   wherein step (B) further comprises:
      (B4) dividing the generated hash value into the first portion and a second portion, the second portion having a selected number of least significant bits of said hash value; and
   wherein the probabilistic change in step (C1) is performed based on the second portion of said hash value.

11. The method of claim 1, further comprising:
   (D) estimating a cardinality of the plurality of items based on the total number of second values stored in the bitmap.

12. The method of claim 11, wherein:
   the probabilities for step (C1) are selected so that a relative estimation error corresponding to step (D) is substantially constant for different cardinality estimates within a dynamic range; and
   the dynamic range is at least $10^5$.

13. The method of claim 12, wherein step (D) comprises:
(D1) computing at least one of (i) an estimate of a first stopping time and (ii) an estimate of a second stopping time, wherein the cardinality is bounded by the first and second stopping times; and
(D2) estimating the cardinality based on at least one of said stopping-time estimates.

14. The method of claim 1, further comprising initializing the bitmap by writing a first value into each bucket of the bitmap.

15. The method of claim 1, wherein:
a host device that implements the method is a network node; and
the plurality of items is a stream of data packets.

16. The method of claim 15, wherein the hash key is derived from a header of a data packet.

17. The method of claim 15, further comprising:
(D) monitoring, over time, a selected characteristic of the stream of packets based on the total number of second values stored in the bitmap.

18. The method of claim 17, further comprising:
(E) detecting malware activity based on the monitoring.

19. A counting device, comprising:
one or more input ports for receiving a plurality of items;
a memory for storing a bitmap having a plurality of buckets, each for storing a binary value; and
a processor adapted to:
derive a hash key for an item of the plurality of items;
apply a hash function to the hash key to identify a corresponding target bucket in the bitmap; and
probabilistically change a first binary value to a second binary value when the target bucket has a first binary value, wherein a probability of the change depends on a total number of second binary values stored in the bitmap, wherein, to identify the corresponding target bucket in the bitmap, the processor is configured to:
generate a hash value by applying the hash function to the hash key;
convert the generated hash value into a number that is different from said hash value, wherein said conversion includes truncating the generated hash value to a selected number of most significant bits; and
use the number into which the generated hash value has been converted to identify the target bucket.

20. The device of claim 19, wherein:
the counting device is part of a network node; and
the plurality of items is a stream of data packets received by the network node.

21. The device of claim 19, the network node is configured to:
monitor, over time, a selected characteristic of the stream of packets based on the total number of second binary values stored in the bitmap; and
detect malware activity based on the monitoring.

22. The device of claim 19, wherein the number into which the generated hash value has been converted is a first portion of said hash value having the selected number of most significant bits of said hash value.

* * * * *